(12) United States Patent
Rangarajan et al.

(10) Patent No.: US 11,181,888 B2
(45) Date of Patent: Nov. 23, 2021

(54) AUTOZONING OF ADDITIVE MANUFACTURING PRINT PARAMETERS

(71) Applicant: GENERAL ELECTRIC COMPANY, Schenectady, NY (US)

(72) Inventors: Arvind Rangarajan, San Ramon, CA (US); Christina Margaret Vasil, Troy, NY (US); Joshua Mook, West Chester, OH (US); Anthony J. Vinciquerra, Niskayuna, NY (US); Brian McCarthy, Niskayuna, NY (US); Vipul Kumar Gupta, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/527,397

(22) Filed: Jul. 31, 2019

(65) Prior Publication Data

US 2021/0034037 A1 Feb. 4, 2021

(51) Int. Cl.
*G05B 19/4099* (2006.01)
*G06K 15/02* (2006.01)
(Continued)

(52) U.S. Cl.
CPC ........ *G05B 19/4099* (2013.01); *B23K 26/342* (2015.10); *B33Y 50/02* (2014.12);
(Continued)

(58) Field of Classification Search
CPC ...... G05B 19/4099; G05B 2219/49007; G05B 2219/35134; B33Y 50/02; G06K 15/1823; B23K 26/342
See application file for complete search history.

(56) References Cited

U.S. PATENT DOCUMENTS 9,895,845 B2 2/2018 Bheda et al.
10,073,424 B2 9/2018 Lin et al.
(Continued)

FOREIGN PATENT DOCUMENTS

| CN | 104504186 B | 10/2017 |
| CN | 108189410 A | 6/2018 |
| WO | 2018127827 A1 | 7/2018 |

OTHER PUBLICATIONS

Brooks et al., "Variable Fused Deposition Modelling—Analysis of Benefits, Concept Design and Tool Path Generation", Conference: 12th Rapid Design, Prototyping & Manufacturing Conference, pp. 511-517, Sep. 2011.

*Primary Examiner* — Thomas C Lee
*Assistant Examiner* — Charles Cai
(74) *Attorney, Agent, or Firm* — Hanley, Flight & Zimmerman, LLC (57) ABSTRACT

A method, medium, and system to automatically determine parameter sets for an additive manufacturing (AM) of a part, the method including executing a load analysis on a model of a part to emulate a load on each of a plurality of regions of the part; determining a representation of the model of the part as a plurality of discrete three-dimensional (3D) volume elements; determining, based on an output of the load analysis, a life or material property value to assign to each of the plurality of 3D volume elements; automatically determining an assignment of one of a plurality of additive manufacturing (AM) print parameter sets to each of the plurality of 3D volume elements; and saving a record of the determined assignments of the AM print parameter sets to each of the plurality of 3D volume elements.

18 Claims, 7 Drawing Sheets

(51) Int. Cl.
  *B23K 26/342* (2014.01)
  *B33Y 50/02* (2015.01)
(52) U.S. Cl.
  CPC ............... *G06K 15/1823* (2013.01); *G05B 2219/35134* (2013.01); *G05B 2219/49007* (2013.01)

(56) References Cited

U.S. PATENT DOCUMENTS

| | | | |
|---|---|---|---|
| 2015/0352794 A1* | 12/2015 | Nguyen | B29C 64/393 |
| | | | 700/98 |
| 2016/0236416 A1* | 8/2016 | Bheda | B33Y 50/02 |
| 2017/0021455 A1 | 1/2017 | Dallarosa et al. | |
| 2018/0341248 A1 | 11/2018 | Mehr et al. | |
| 2019/0026415 A1* | 1/2019 | Han | G06F 30/17 |
| 2019/0321185 A1* | 10/2019 | Xue | A61F 2/3662 |
| 2020/0156323 A1* | 5/2020 | Woytowitz | G06F 30/23 |

* cited by examiner

AUTOZONING OF ADDITIVE MANUFACTURING PRINT PARAMETERS

BACKGROUND

The field of the present disclosure generally relates to additive manufacturing, and more particularly, to an additive manufacturing methodology and tool to automatically determine print parameters for optimal additive manufacturing productivity.

Parts generated using additive manufacturing (AM) processes are typically generated (e.g., printed) using one, common set of print parameters for the entire part being produced. For example, an AM process such as, for example, direct metal laser melting (DMLM) process, prints a part, or a section of a part (e.g., bulk, thin-wall, overhang), using a same laser power, same laser scan speed, same hatch spacing, same layer thickness, and same laser beam spot-size for the entirety of the build (i.e., first layer through last layer) of the part, or a section of the part.

In some instances and use-cases, one or more portions of a part might be more heavily loaded than other portions of the same part. A design process to determine the print parameter set to use in an AM process for the part might typically consider the most heavily-loaded portions of the part, in an effort to ensure that all portions of the part (i.e., the entire part) meets or satisfies the minimum design specifications for the part. However, a consequence of this typical design philosophy will likely result in the over-design of at least some portions of the part since not every portion of the part will be subjected to the heaviest of foreseen loads the part will experience. That is, the typical AM design process will determine the print parameter set to be used to print the part based on the maximum loads, even though only a portion of the part is anticipated to be subjected to the maximum load.

Accordingly, in some respects, a need exists for methods and systems that provide an efficient and accurate mechanism for automatically determining AM print parameter sets for a part that increases, for example, productivity while satisfying the design specifications for the part.

DETAILED DESCRIPTION

Embodying systems and methods herein relate to Additive Manufacturing (AM) systems that, in general, produce a three-dimensional (3D) object or assembly by printing materials under computer control. AM processes and systems may successively add materials, for example in layers, to create the three-dimensional assembly or object based on 3D model data (i.e., a specification) of the part. In general, objects, assemblies or parts (as generally referred to herein) generated using AM processes might be conventionally produced by an AM device or system using a single, constant print parameter set for build of the part. That is, a single, constant print parameter set may be used (i.e., applied) during the entirety of a single build of the part. The print parameter set for the part build may be determined based on the margins for the limiting condition(s) applicable or otherwise imposed on the design process for the part. For a part having isolated areas or regions thereof requiring (e.g., per design constraints, design objectives, etc.) high-fidelity print parameters, the entire part will be printed with the high-fidelity print parameters since a single, constant print parameter set will be used (i.e., applied) during the entire build of the part, in the conventional AM process scenario. As a result, the remainder of the areas, regions, or portions of the part other than the isolated areas or regions of the part not requiring the use of high-fidelity print parameters during the AM process will also be printed using the high-fidelity print parameters. Consequently, the remainder of the part might be printed with material properties exceeding that which are necessary within safety, useful life, design, and other margin constraints for the part. Since high-fidelity print parameters used to achieve "conservative" high-fidelity material properties might require a longer print time than other, "less-conservative" low-fidelity print parameters, printing a part within a single build strictly using the high-fidelity print parameters may have the undesired effect of, for example, unnecessarily increasing the production time and/or costs to print the part. On the other hand, printing an entire part with low-fidelity print parameters may have undesired impact on part quality and may not be able to meet target material properties requirements in critical regions of the part.

In some aspects herein, the present disclosure encompasses a system, tool, and methodology to automatically determine a plurality of different print parameters for manufacturing a part within a single build, wherein the plurality of different print parameters are determined based on analytical results, numerical results, and/or a combination thereof as determined for the part. In some instances, the determined plurality of different print parameters (e.g., print parameter sets) might be selectively used by an AM system to generate the part with increased laser scan speed or larger hatch spacing (as compared to producing the part with a single print parameter set), while also maintaining safety, useful life, design, and other margin constraints specified for a given application of the part.

Figure 1:
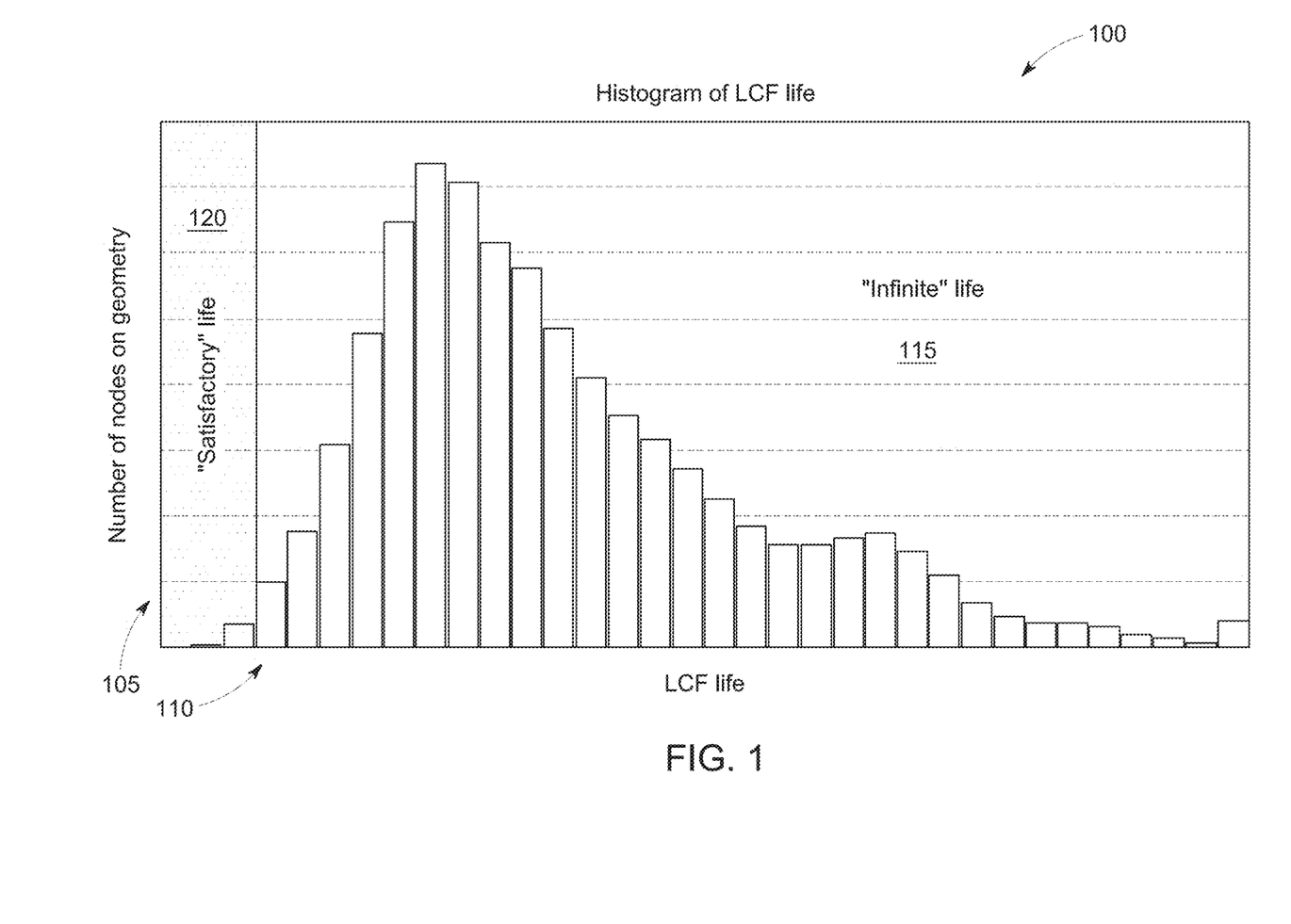
FIG. 1 is an illustrative example histogram of analytical results depicting life cycles for a part to be additively manufactured, in accordance with some aspects of an example process herein.

FIG. 1 is an illustrative depiction of an example histogram 100 of analytical nodal results of low cycle fatigue (LCF) life-cycles for a given part to be produced by an AM process, wherein the part meets or satisfies all material design constraints. In FIG. 1, the x-axis 110 represents the relative LCF life-cycles to failure and the y-axis 105 represents that number of nodes for the part. As used herein, the term "life-cycles" refers to the number of repeated applications of stress that will lead to fatigue failure. In the example histogram 100 of FIG. 1, a portion of the part is considered to have "infinite" life when the part will not fail at an experienced stress-level. As seen from FIG. 1, a major proportion of the part, as represented by area 115, has an "infinite" life. Due to the small proportion of the part, as represented by area 120, having a "satisfactory" life (e.g., less than the "infinite" life), the entire part would otherwise be printed with one set of "conservative" high-fidelity print parameters. Printing the entire part with one set of print parameters to accommodate a small region of the part will increase the time to print the part (i.e., slow down the AM printing process). That is, while the one set of print parameters might be sufficient to accommodate the small region of the part (i.e., the portion(s) with less than "infinite" life cycles to failure), the single prescribed set of print parameters is more than that which is necessary for the remaining major portion of the part, as indicated by the "infinite" life.

As an example, if a life-cycle analysis of a given part determines that a portion of the part has a predicted life-cycle less than infinite and the rest of the part has an infinite life-cycle, then it may be concluded that the portions of the part having an "infinite" life-cycle are over-designed based on the premise that it is not practical or necessary for, at least some, portions of the part to have an infinite life-cycle.

In some aspects herein, a life-cycle analysis of a part might be leveraged so that at least one portion/region of a part with a predicted "infinite" life-cycle may be printed faster, using print parameters different (e.g., lower fidelity) than a set of (e.g., relatively higher fidelity) print parameters that would produce the predicted "infinite" life-cycle. In general, faster printing by an AM process may result in a relatively lower quality of material (and potentially some deficit in material performance), relative to slower print speeds and corresponding higher fidelity AM build print parameter sets. In some aspects, the lower quality of material produced by the faster printing AM process, as controlled by corresponding print parameter set(s), will be selected or determined such that they still maintain, meet, or other satisfy all material quality, safety, useful life, design, and other margin constraints (i.e., design specifications) for the part.

In some embodiments, the present disclosure includes a methodology to modify or otherwise determine different print parameter sets for an AM process for a part within a single build based on analytical results, numerical results, and/or a combination thereof. In some instances, the methodology might operate to increase a print speed (i.e., build productivity) and/or decrease other costs/objectives (e.g., production cost by reducing overall machine use and labor) associated with printing the part, all while achieving or maintaining a minimum (e.g., specified) part life (or other one or more objectives and/or constraints) for the part. In some aspects, the present disclosure relates to a process and system that determine different print parameter sets for a given part, on a granular level for each of a predetermined portion, region, or area of the part, as opposed to a single AM build print parameter set for the entire part or a section of the part (e.g., bulk, thin-walls, over-hangs). In some embodiments, an AM print parameter set might be determined based on, for example, a per layer basis, a per voxel basis, and any other unit of volume (i.e., volume unit) representation of the part. In some aspects, the print parameter sets determined herein are design-based changes and determinations, in contrast to prior and/or other print parameter sets determined based on a geometry of the part being produced.

Figure 2:
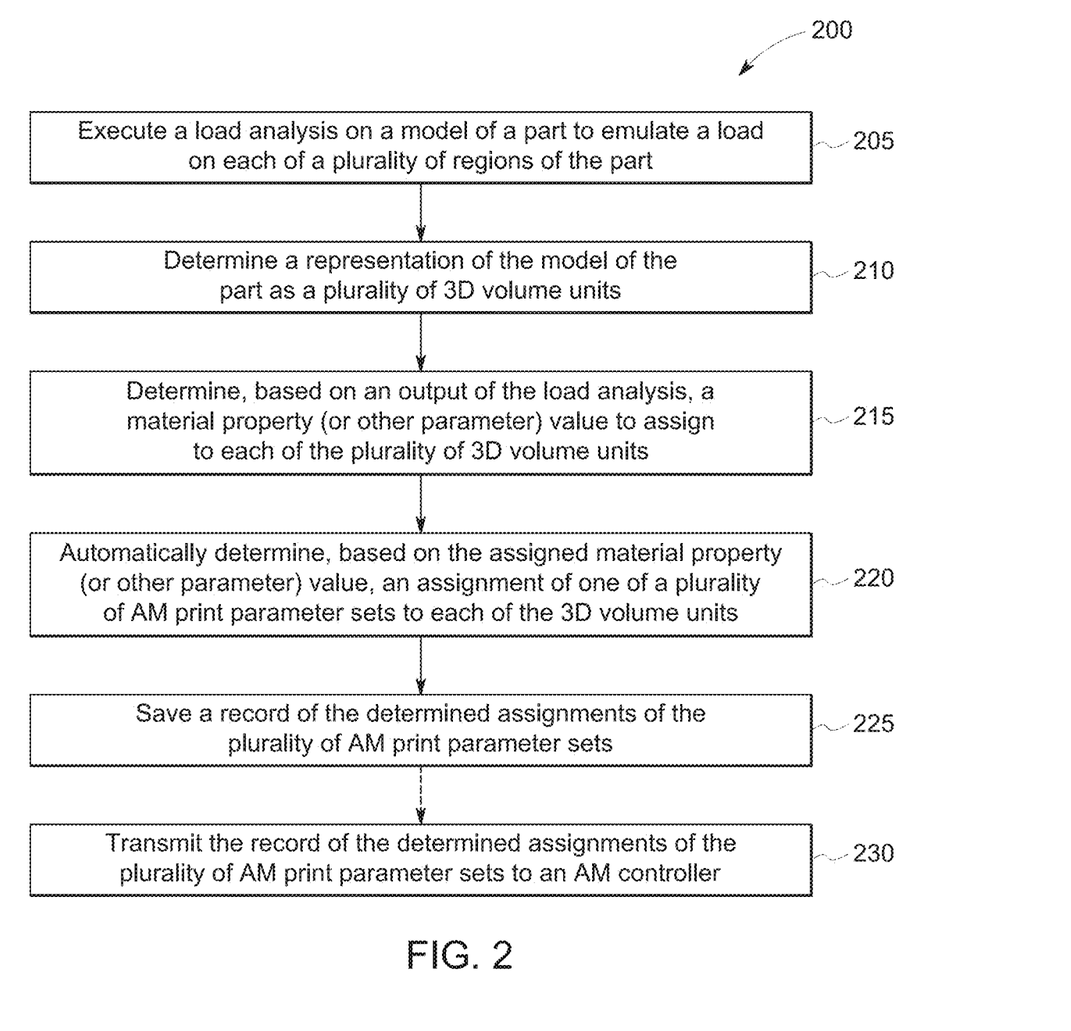
FIG. 2 is an illustrative flow diagram of an automatic print parameter generation process, in accordance with some embodiments.

FIG. 2 is an illustrative example of a process 200, according to some embodiments herein. Process 200 includes a mechanism to maintain or change a set of original print parameters for an AM process to build a given part based on analytical results, numerical results, and/or a combination thereof. In accordance with some aspects of process 200, print parameter sets may be determined based on a function of how a part will be or will likely be used. As such, process 200 relates to a design-based process to determine different print parameter sets for an AM part build. In some aspects, process 200 is not to limited to any one particular AM process protocol, modality, system, or device, unless otherwise noted herein. In one example, process 200 may be implemented in the context of a direct metal laser melting (DMLM) process, where the set of print parameters might include, for example, a laser power, a laser scan speed, hatch-spacing, and a laser beam spot-size, although additional, fewer, and other print parameters may be considered, alone or in combination.

Figure 3A:
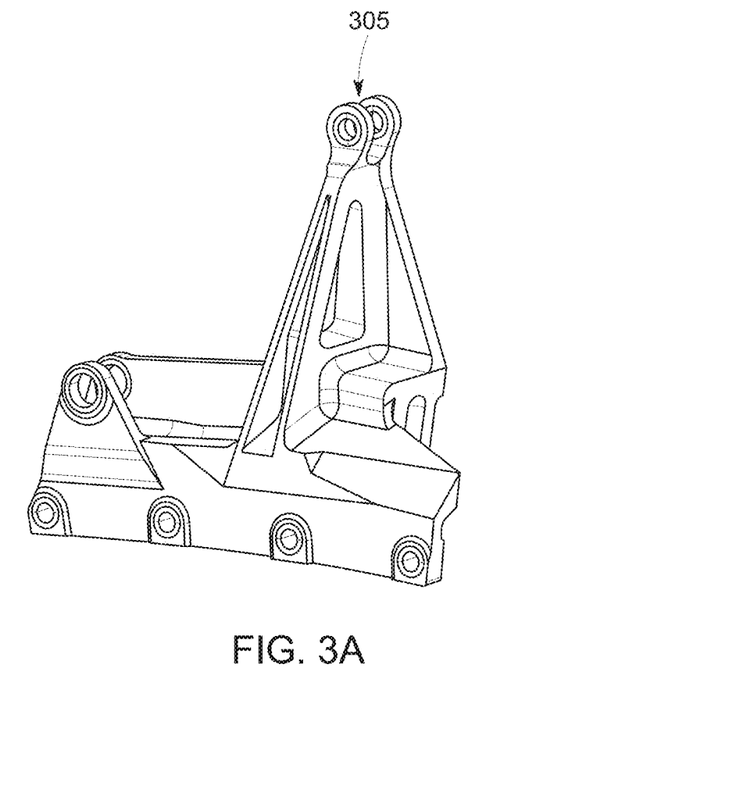
FIGS. 3A-3E are illustrative depictions of various aspects of an automatic print parameter generation process, in accordance with some aspects of an example process herein.

Process 200 of FIG. 2 will now be discussed in combination with FIGS. 3A-3E that include illustrative depictions corresponding, in part, to the various operations of process 200. Referring to process 200, a model representation of a part to be produced by an AM process may be obtained, prior to, in response to a request to start process 200, or as part of process 200. The model of the part may be embodied in a tangible, non-transitory data structure, such a file or record. The model of the part may be formatted or configured in any file format now known or that becomes known, that sufficiently describes the part for purposes of executing process 200. The model of the part might be obtained by an operator, servicer, or provider of an AM process or service. FIG. 3A is an illustrative depiction of a model of a part 305, where the model representation of the part may be processed by a processor-based system, tool, or device implementing process 200.

Figure 3B:
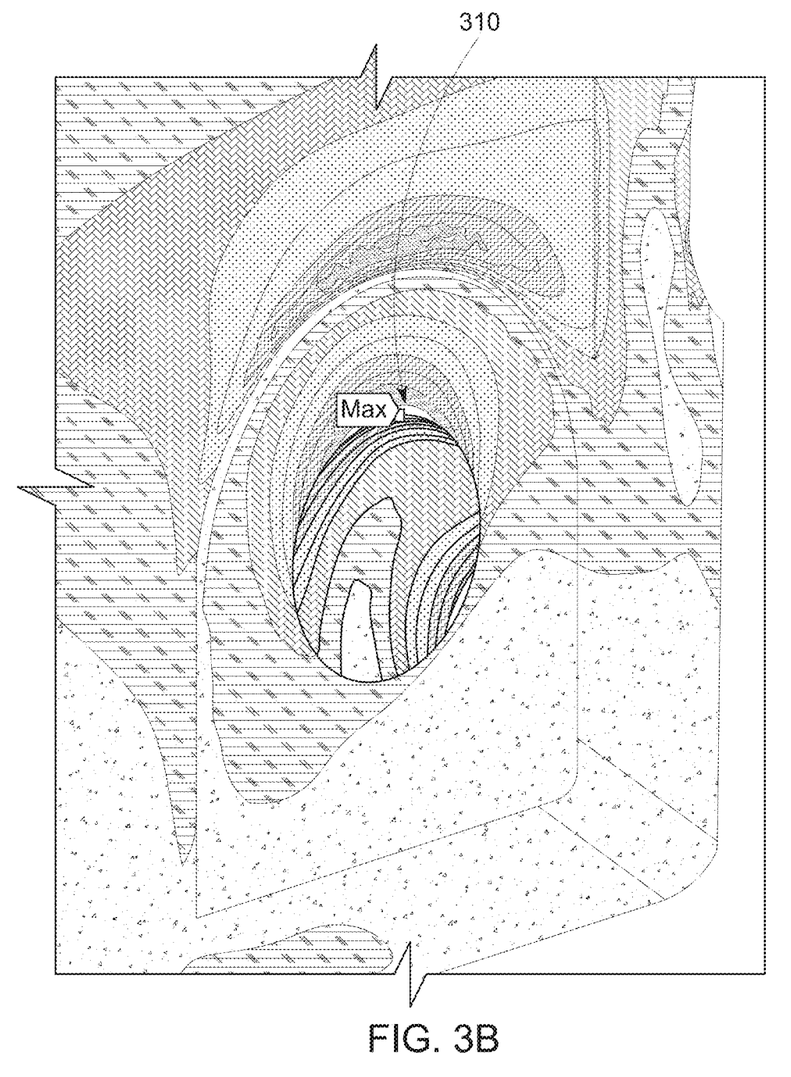

Having obtained the model of the part, an AM simulation using an initial (i.e., original, default, or previously determined (e.g., estimated) print parameter set) is executed on the model of the part at operation 205. An objective of the simulation of operation 205 may be to perform a physical, load analysis using the relevant design boundary conditions and material properties of the part to emulate the forces and stresses each area or region of the part might be subjected to during the part's life. For example, the analysis might determine areas or regions of high loading (e.g., FIG. 3B, region 310). In the present example, the high loading region(s) may likely fail before other portions or regions of the part. In some aspects, the high load region(s) of a part may be the life-limiting region(s) for the part that will fail first. Accordingly, process 200 may operate to meet or satisfy the material specifications for high-loading region 310. In the example of FIG. 3B, the original print parameter set may not be modified or otherwise changed for the high load regions(s) therein (e.g., region 310).

While only one high load region is shown (for purposes of clarity) in the example of FIG. 3B, neither process 200 or any other process(es) or portions thereof are limited with respect to the number of high load regions, other regions, and total regions for a part, unless otherwise stated herein.

Figure 3C:
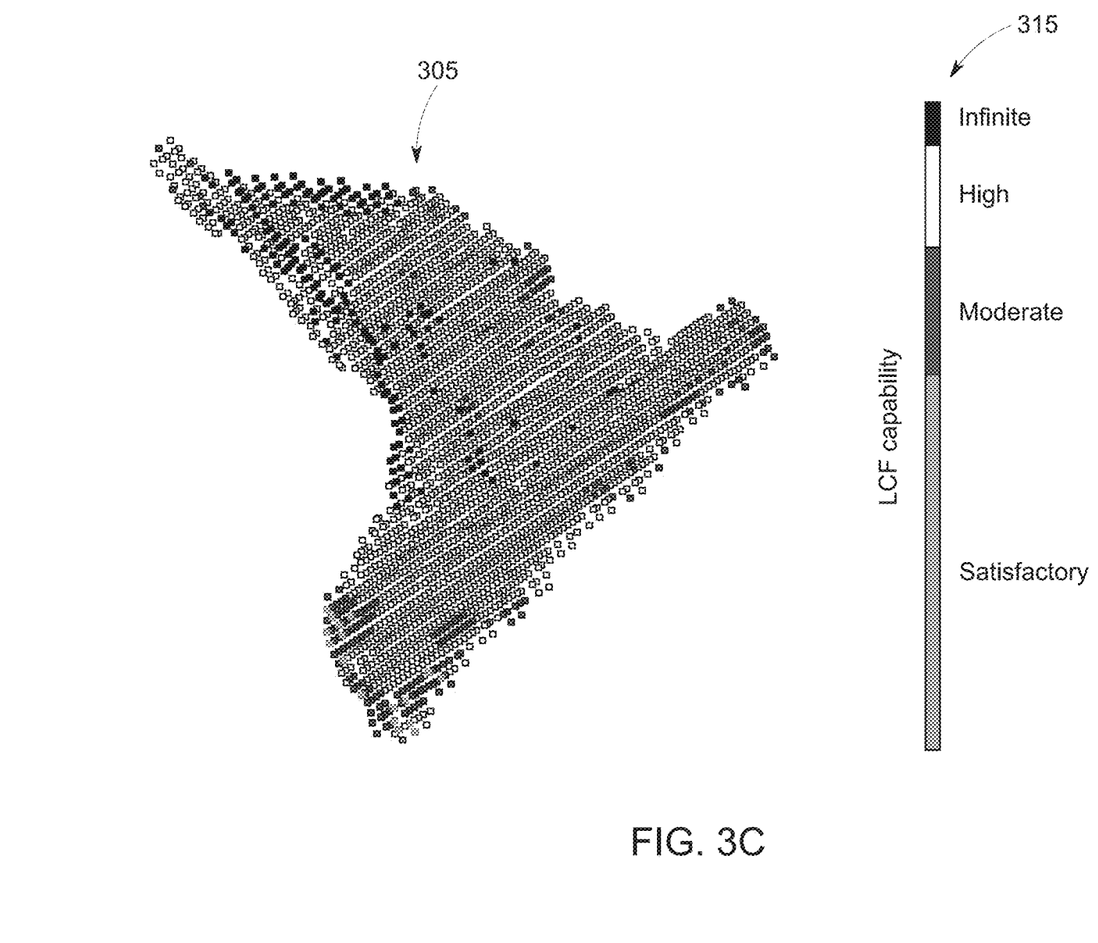

The analysis of the part at operation 205 (or another separate operation) may include extracting nodal results representing the margin related to the primary failure mode (i.e., LCF life cycles or other one or more material property parameters) and providing an output (i.e., record) thereof. FIG. 3C is an illustrative depiction of part 305 having the regions or areas thereof color-coded (i.e., as represented by the different levels of shading on part 305) to correspond with the minimum LCF margins scale 315, where portions of the part having a similar LCF, as determined by the load analysis, are similarly color-coded.

Figure 3D:
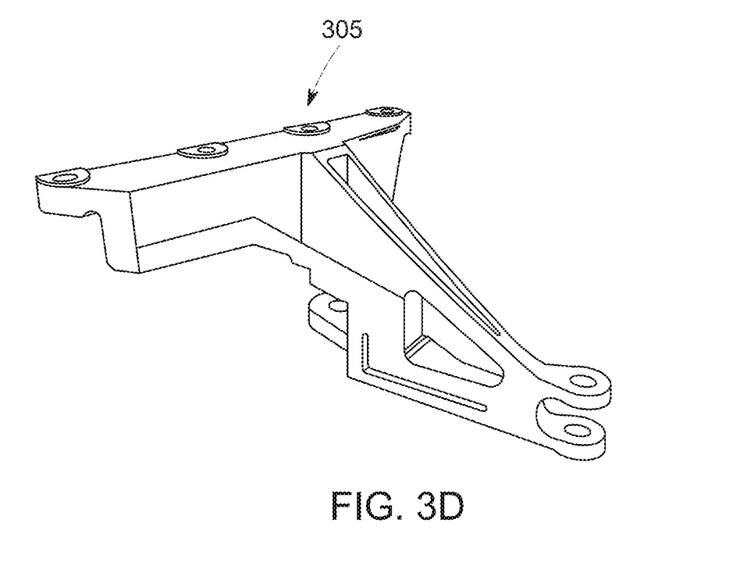

At operation 210, a determination is executed to obtain a representation of the model of the part as a plurality of discrete three-dimensional (3D) volume units. In some instances, the volume units might be a 3D voxel, a plurality of 3D voxels, or other defined or specified volumetric unit of 3D measure. FIG. 3D is an illustrative depiction of model of the part 305 that may be represented as, for example, a plurality of discrete voxels.

At operation 215, process 200 executes to determine, based on an output of the load analysis performed at operation 205, a life cycle (or other one or more parameter) value(s) to assign to each of the plurality of discrete 3D volume elements. As used herein, the life-cycle value associated with each 3D volume represents or is otherwise indicative of how long each respective 3D volume "live" to perform as it is designed (i.e., the 3D volume unit's life-cycle). In some respects, the predicted life-cycle is determined based on the analysis at operation 205.

In some embodiments, the parameter associated with each 3D volume at operation 215 may not be limited to be an indication or representation of LCF life. In some embodiments, the parameter value might be one or more of any material quality (e.g., density, surface roughness, etc.), mechanical property (e.g., tensile strength, hardness, creep, etc.), physical property (e.g., density, thermal conductivity, etc.), and other properties. That is, the particular properties or constraints that might be considered as a basis for determining print parameters in some embodiments herein is not limited to LCF life, unless otherwise specified.

In some instances, the particular one or more property values associated with the 3D volume units or elements might vary depending on the 3D volume. As an example, some voxels of a model of a part might be associated with an LCF value, whereas some other voxels of the model of the part might be associated with a density value. In this manner, the properties associated with the model of the part might be tailored the particular model on the unit volume element level.

At operation 220, based on the LCF life (or other parameter or constraint) value assigned to each of the plurality 3D volume elements, one of a plurality of AM print parameters sets is automatically assigned to each of the plurality of 3D volume elements. This determination of assignments might be implemented by a variety of processes. In one embodiment, a software application may generate, obtain, or otherwise provide one or more transfer functions that represent the relationship(s) between the expected material outcomes (e.g., LCF life, tensile strength, surface-roughness, density, etc.) and the AM print parameters used to control an AM or 3D printing process. The transfer function(s) may be used to leverage and relate the LCF life (or other parameter or constraint) values assigned to each of the plurality 3D volume elements to AM print parameters. In one example embodiment, a software module might use an existing library of parameters and properties, and select parameters that meet the design criteria for the plurality of 3D volume elements.

Figure 3E:
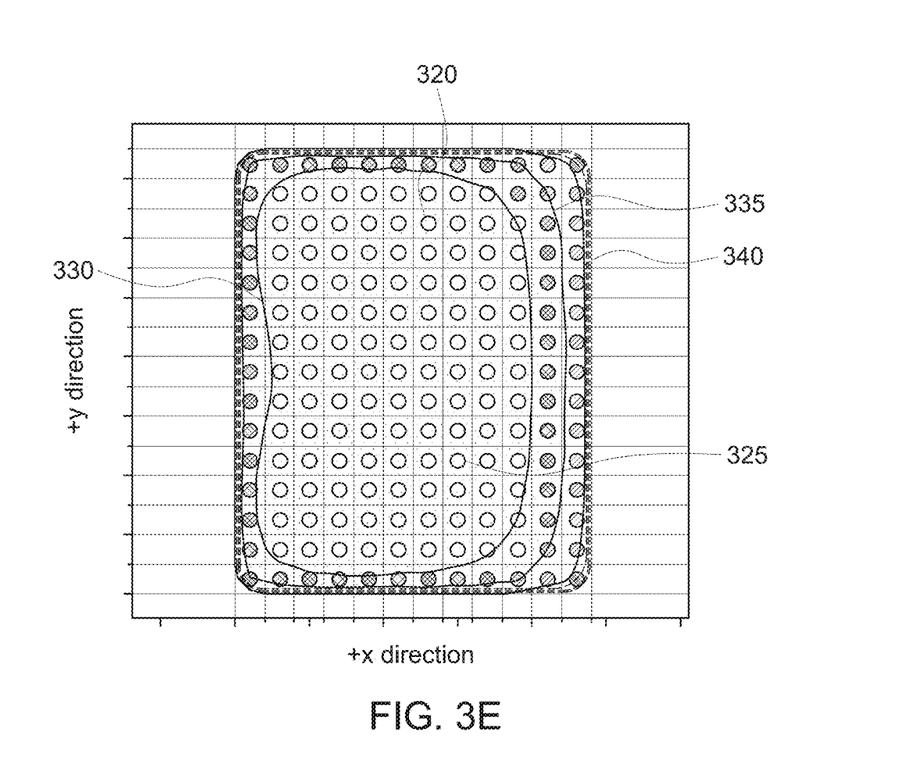

FIG. 3E is an illustrative depiction of an analysis wherein the 3D representation (e.g., "voxelized") of the model and the associated, desired design outcomes are considered by a process (e.g., one or more transfer functions, a library of print parameters and material properties, etc.) to generate recommendations of the particular AM print parameter set to assigned to each 3D volume element to obtain the desired design criteria. FIG. 3E depicts a representation of a part 310 comprising a plurality of unit volumes (e.g., 320, 325), wherein a specific AM print parameter set is assigned to each 3D unit volume. In some embodiments, volume units or elements determined to have the same or similar AM print parameter set to assigned thereto may be grouped together in a same "bin", where the number of bins and parameter sets may be (pre-)determined. In the example of FIG. 3E, three (3) groupings or bins 330, 335, and 340 of the representative 3D volume units are illustrated.

In some embodiments, dilation or smoothing may be used to expand (or contract) a margin or range of 3D volume units surrounding one or more particular 3D volume units to have the same specific AM print parameter set is assigned thereto. In this manner, a particular 3D volume unit determined to have a specific AM print parameter set is assigned to it may have an adjacent (arbitrary) number of surrounding 3D volume units also assigned the same specific AM print parameter set, even though a different AM print parameter set may have been determined for those adjacent (arbitrary) number of surrounding 3D volume units. This type of dilation or smoothing may be used to, for example, obtain a margin of safety around sensitive or critical regions of the part, and also to avoid abrupt changes in print parameters at such locations.

Returning to FIG. 2, a record of the determined assignments of the plurality of AM print parameters sets to the 3D volume elements is saved or otherwise stored at operation 225. The saved record of the AM print parameter sets assignments may be persisted in, for example, a database, a cloud-based data storage system, or other local, remote, centralized, or distributed data systems, stores, or warehouses.

In some embodiments, operations 205-225 may comprise the operations of process 200. In some instances, operation 230 represents an example of an integrated use or application of process 200, including the record of the determined assignments of the plurality of AM print parameters sets to the 3D volume elements. For example, the record might be transmitted to an AM controller of an AM system or device, wherein the AM controller may use the information specified in the record to command the AM device or system to generate the part using the plurality of AM print parameter sets assigned to each volume unit of the part as specified in the record. It is noted that the record might be used for other applications, including, for example, executing a distortion model based on the record to, for example, validate the AM print parameter set assignments (i.e., do the recommended AM print parameter set assignments produced the expected, acceptable distortions or are different (e.g., greater) and/or new distortions introduced). In some instances, the AM print parameter set assignments might be adjusted or re-assigned if an outcome of their (simulated) use is not satisfactory.

In some embodiments of an auto-zoning process herein, one or more aspects and operations of process 200 (e.g., operations 205-220 and/or portions thereof) may be performed iteratively.

In some aspects, process 200 is not limited to any particular AM modality. In some instances, process 200 may be adapted or otherwise applied to AM modalities, systems, and devices other than the specific DMLM process introduced above. In some aspects, the AM print parameter sets herein may include one or more different parameters, wherein the specific parameters included therein may vary depending the particular AM modality. In some aspects, an auto-zoning process herein, including but not limited to the example of process 200, may be applied to different additive modalities (e.g., binder-jet, electron-beam melting, directed-energy deposition, selective laser sintering, etc. for metallic, non-metallic, and polymer/ceramic materials) and design objectives (e.g., fatigue, tensile strength, density, and, in general, any other material properties/mechanical performance objectives).

In some embodiments, aspects of the present disclosure may be customized by, for example, adjusting the size of the 3D volume units, where the size of the 3D volume units might be determined based on, for example, a desired level of granularity. In some instances, the desired level of granularity might be associated with a level of control or efficiency in achieving a particular or desired objective (e.g., AM process speeds, material properties, etc.) and/or capabilities of an AM system or device.

In some embodiments, the number of AM print parameter sets that might be specified for use in a single build of a particular part is not limited by the present disclosure. In some instances, a practical limit might be reached based on, for example, operating constraints of a particular AM device or system. In some instances, the number of AM print parameter sets specified for use in a single build of a particular part might be associated with or correspond to a (pre-)determined set number, particularly in the instance that little or minimum benefits are gained by using additional AM print parameter sets (if even possible).

Figure 4:
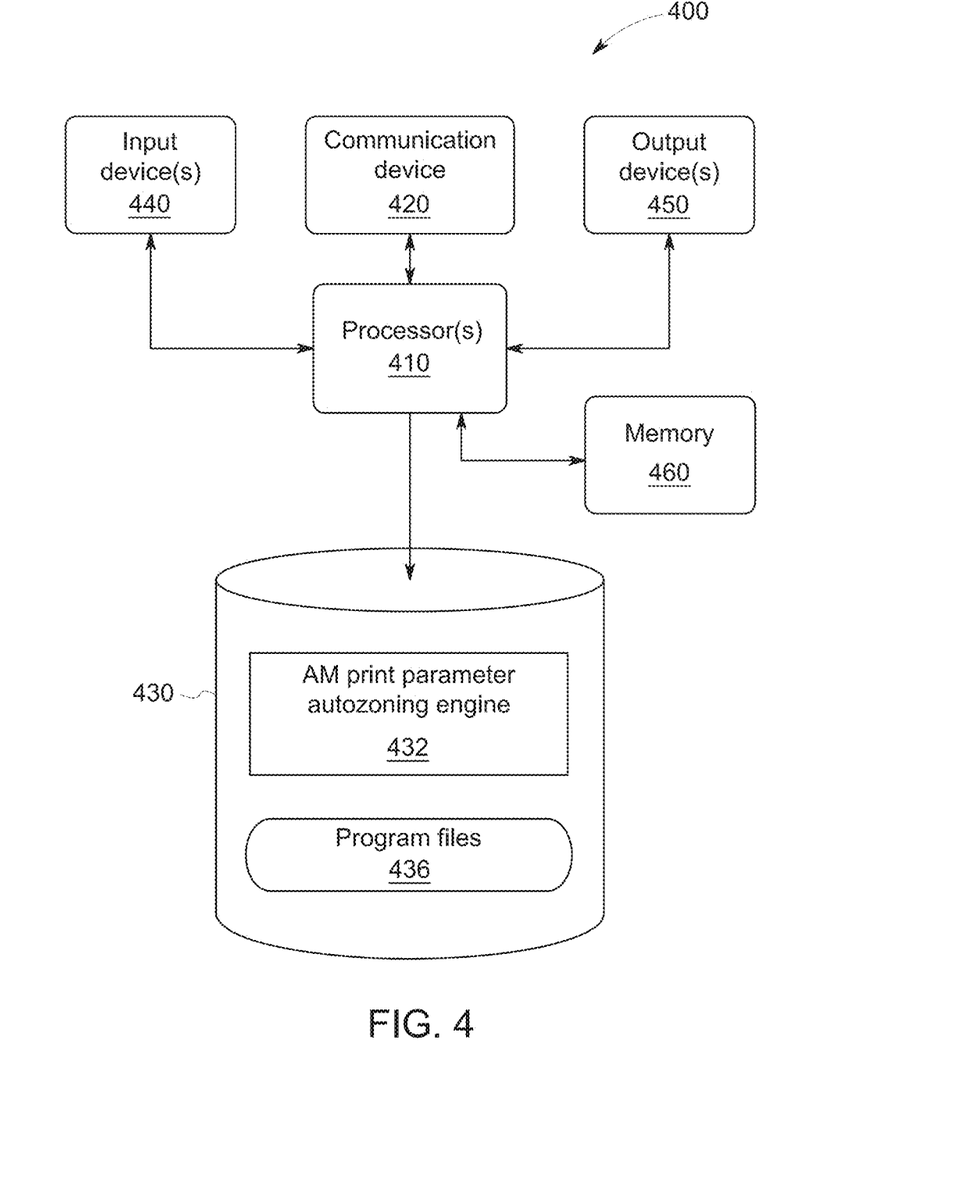
FIG. 4 illustrates a schematic diagram of a system, in accordance with some embodiments.

FIG. 4 is a block diagram of computing system 400 according to some embodiments. System 400 may comprise a general-purpose or special-purpose computing apparatus and may execute program code to perform any of the methods, operations, and functions described herein. System 400 may comprise an implementation of one or more systems (e.g., an AM system or parts thereof, etc.) and processes (e.g., process 200 and/or portions thereof). System 400 may include other elements that are not shown, according to some embodiments.

System 400 includes processor(s) 410 operatively coupled to communication device 420, data storage device 430, one or more input devices 440, one or more output devices 450, and memory 460. Communication device 420 may facilitate communication with external devices, such as a data server and other data sources. Input device(s) 440 may comprise, for example, a keyboard, a keypad, a mouse or other pointing device, a microphone, knob or a switch, an infra-red (IR) port, a docking station, and/or a touch screen. Input device(s) 440 may be used, for example, to enter information into system 400. Output device(s) 450 may comprise, for example, a display (e.g., a display screen) a speaker, and/or a printer.

Data storage device 430 may comprise any appropriate persistent storage device, including combinations of magnetic storage devices (e.g., magnetic tape, hard disk drives and flash memory), optical storage devices, Read Only Memory (ROM) devices, etc., while memory 460 may comprise Random Access Memory (RAM), Storage Class Memory (SCM) or any other fast-access memory. Files including, for example, model representations of a part, output records of processes (e.g., process 200 and/or portions thereof) herein, and other data structures may be stored in data storage device 430.

AM Print Parameter Auto-zoning Engine 432 may comprise program code executed by processor(s) 410 (and within the execution engine) to cause system 400 to perform any one or more of the processes described herein. Embodiments are not limited to execution by a single apparatus. Data storage device 430 may also store data and other program code 436 for providing additional functionality and/or which are necessary for operation of system 400, such as device drivers, operating system files, etc.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods disclosed herein, such as a method of determining a design a part and a combination of a thermal support structure and a structural support structure.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

What is claimed is:

1. A method comprising:

executing, by a processor, a load analysis on a model of a part to emulate a load on each of a plurality of regions of the part;

determining, by the processor, a representation of the model of the part as a plurality of discrete three-dimensional (3D) volume elements;

adjusting, by the processor, sizes of the plurality of 3D volume elements based on a desired level of granularity;

determining, by the processor and based on an output of the load analysis, a material property value to assign to each of the plurality of 3D volume elements, wherein the material property values assigned to the plurality of 3D volume elements are classified into a predetermined number of bins that correspond to a plurality of different additive manufacturing (AM) print parameter sets;

automatically determining, by the processor and based on the material property value assigned to each of the plurality of 3D volume elements, an assignment of one of the plurality of different AM print parameter sets to each of the plurality of 3D volume elements;

saving a record of the determined assignments of the plurality of AM print parameter sets to each of the plurality of 3D volume elements;

transmitting the record of the determined assignments of the plurality of different AM print parameter sets to each of the plurality of 3D volume elements to an AM controller, the AM controller to control an AM system to generate the part based on the model of the part and the determined assignments of the plurality of different AM print parameter sets to each of the plurality of 3D volume elements, the generated part to be built with the determined assignments of the plurality of different AM print parameter sets in a single build;

validating the determined assignments of the plurality of different AM print parameter sets for the plurality of 3D volume elements; and adjusting, in response to at least one of the determined assignments of the plurality of different AM print parameter sets for the plurality of 3D volume elements not being valid, the AM print parameter sets for at least one of the plurality of 3D volume elements during the single build.

2. The method of claim 1, wherein the load analysis on the model of the part uses, as inputs to the load analysis, boundary conditions and material properties for the part.

3. The method of claim 1, wherein the determined material property value is a predicted life-cycle for one of the plurality of regions of the part represented by one of the plurality of 3D volume elements to which it is assigned.

4. The method of claim 1, wherein each of the plurality of 3D volume elements includes at least one of a voxel or a plurality of voxels.

5. The method of claim 1, wherein the determination of the assignment of one of the plurality of different AM print parameter sets to each of the plurality of 3D volume elements is based on at least one of a design requirement for the part, the output of the load analysis, or at least one of a material response characteristic for the part.

6. The method of claim 1, wherein each of the plurality of regions forming the generated part complies with a design requirement for the part.

7. The method of claim 1, wherein at least one of the executing of the load analysis, the determining of the material property value, or the determining of the assignment is performed iteratively after an initial performance of the assignment of one of the plurality of different AM print parameter sets to each of the plurality of 3D volume elements.

8. The method of claim 1, wherein the AM controller controls the AM system to execute a distortion model based on the transmitted record.

9. A system comprising:
a memory storing processor-executable instructions; and
one or more processors to execute the processor-executable instructions to:
execute a load analysis on a model of a part to emulate a load on each of a plurality of regions of the part;
determine a representation of the model of the part as a plurality of discrete three-dimensional (3D) volume elements;
adjust sizes of the plurality of 3D volume elements based on a desired level of granularity;
determine, based on an output of the load analysis, a material property value to assign to each of the plurality of 3D volume elements, wherein the material property values assigned to the plurality of 3D volume elements are classified into a predetermined number of bins that correspond to a plurality of different additive manufacturing (AM) print parameter sets;
automatically determine, based on the material property value assigned to each of the plurality of 3D volume elements, an assignment of one of the plurality of different AM print parameter sets to each of the plurality of 3D volume elements;
save a record of the determined assignments of the plurality of AM print parameter sets to each of the plurality of 3D volume elements;
transmit the record of the determined assignments of the plurality of different AM print parameter sets to each of the plurality of 3D volume elements to an AM controller, the AM controller to control an AM system to generate the part based on the model of the part and the determined assignments of the plurality of different AM print parameter sets to each of the plurality of 3D volume elements, the generated part to be built with the determined assignments of the plurality of different AM print parameter sets in a single build;
validate the determined assignments of the plurality of different AM print parameter sets for the plurality of 3D volume elements; and
adjust, in response to at least one of the determined assignments of the plurality of different AM print parameter sets for the plurality of 3D volume elements not being valid, the AM print parameter sets for at least one of the plurality of 3D volume elements during the single build.

10. The system of claim 9, wherein the load analysis on the model of the part uses, as inputs to the load analysis, boundary conditions and material properties for the part.

11. The system of claim 9, wherein the determined material property value is a predicted life-cycle for one of the plurality of regions of the part represented by one of the plurality of 3D volume elements to which it is assigned.

12. The system of claim 9, wherein each of the plurality of 3D volume elements includes at least one of a voxel or a plurality of voxels.

13. The system of claim 9, wherein the determination of the assignment of one of the plurality of different AM print parameter sets to each of the plurality of 3D volume elements is based on at least one of a design requirement for the part, the output of the load analysis, or at least one of a material response characteristic for the part.

14. The system of claim 9, wherein each of the plurality of regions forming the generated part complies with a design requirement for the part.

15. The system of claim 9, wherein at least one of the executing of the load analysis and the determining of the material property value, or the determining of the assignment is performed iteratively after an initial performance of the assignment of one of the plurality of different AM print parameter sets to each of the plurality of 3D volume elements.

16. The system of claim 9, wherein the AM controller controls the AM system to execute a distortion model based on the transmitted record.

17. A non-transitory computer-readable medium storing instructions that, when executed by a computer processor, cause the computer processor to:
execute a load analysis on a model of a part to emulate a load on each of a plurality of regions of the part;
determine a representation of the model of the part as a plurality of discrete three-dimensional (3D) volume elements;
adjust sizes of the plurality of 3D volume elements based on a desired level of granularity;
determine, based on an output of the load analysis, a material property value to assign to each of the plurality of 3D volume elements, wherein the material property values assigned to the plurality of 3D volume elements are classified into a predetermined number of bins that correspond to a plurality of different additive manufacturing (AM) print parameter sets;
automatically determine, based on the material property value assigned to each of the plurality of 3D volume elements, an assignment of one of the plurality of different AM print parameter sets to each of the plurality of 3D volume elements;
save a record of the determined assignments of the plurality of AM print parameter sets to each of the plurality of 3D volume elements;

transmit the record of the determined assignments of the plurality of different AM print parameter sets to each of the plurality of 3D volume elements to an AM controller, the AM controller to control an AM system to generate the part based on the model of the part and the determined assignments of the plurality of different AM print parameter sets to each of the plurality of 3D volume elements, the generated part to be built with the determined assignments of the plurality of different AM print parameter sets in a single build;

validate the determined assignments of the plurality of different AM print parameter sets for the plurality of 3D volume elements; and adjust, in response to at least one of the determined assignments of the plurality of different AM print parameter sets for the plurality of 3D volume elements not being valid, the AM print parameter sets for at least one of the plurality of 3D volume elements during the single build.

18. The medium of claim 17, wherein the determined material property value is a predicted life-cycle for one of the plurality of regions of the part represented by one of the plurality of 3D volume elements to which it is assigned.

\* \* \* \* \*